United States Patent
Hecht et al.

(10) Patent No.: US 8,062,176 B2
(45) Date of Patent: *Nov. 22, 2011

(54) METHOD FOR THE AUTOMATIC CONTROL OF A NEUTRAL POSITION AND A PARKING LOCK OF A MOTOR VEHICLE TRANSMISSION

(75) Inventors: Walter Hecht, Ravensburg (DE); Armin Gierling, Langenargen (DE); Klaus Steinhauser, Kressbronn (DE); Frank Worms, Langenargen (DE); Bernd Zänglein, Ravensburg (DE); Stéphane Klein, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 560 days.

This patent is subject to a terminal disclaimer.

(21) Appl. No.: 12/257,525

(22) Filed: Oct. 24, 2008

(65) Prior Publication Data

US 2009/0111654 A1 Apr. 30, 2009

(30) Foreign Application Priority Data

Oct. 24, 2007 (DE) .......................... 10 2007 000 556

(51) Int. Cl.
*B60W 10/00* (2006.01)
*F16H 61/16* (2006.01)
*G06F 19/00* (2006.01)

(52) U.S. Cl. .............................. 477/96; 477/125; 701/62

(58) Field of Classification Search ................... 477/97, 477/115, 125, 96; 701/62, 65; 180/271, 180/282, 285
See application file for complete search history.

(56) References Cited

U.S. PATENT DOCUMENTS

| 3,937,105 | A | 2/1976 | Arai et al. |
| 4,892,014 | A | 1/1990 | Morell et al. |
| 5,919,112 | A | 7/1999 | Michael et al. |
| 2009/0111649 | A1* | 4/2009 | Hecht et al. ............ 477/92 |

FOREIGN PATENT DOCUMENTS

| DE | 41 27 991 A1 | 2/1993 |
| EP | 0 814 287 A2 | 12/1997 |

* cited by examiner

*Primary Examiner* — Roger Pang
(74) *Attorney, Agent, or Firm* — Davis & Bujold, P.L.L.C.

(57) ABSTRACT

The invention concerns a method for the automatic control of a neutral position and a parking lock of an automatic or automated motor vehicle transmission, such that the neutral position and the parking lock of the transmission provided in order to immobilize the motor vehicle can be engaged as a function of a drive setting selected by the driver of the motor vehicle using a selector device, and as a function of other operating parameters of the vehicle. In addition, the invention concerns a motor vehicle controlled by the method.

It is proposed that a N-holding phase in which the transmission is in a friction-force-free neutral position can be activated by way of a separate operating device provided in addition to the selector device, only when the motor vehicle is at least almost at rest and at the same time an ignition circuit that acts upon a drive motor of the motor vehicle is electrically interrupted, and at the same time a drive setting "Neutral" (N) is set by way of a selector device, and so long as the parking lock of the transmission has not yet been engaged.

25 Claims, 5 Drawing Sheets

METHOD FOR THE AUTOMATIC CONTROL OF A NEUTRAL POSITION AND A PARKING LOCK OF A MOTOR VEHICLE TRANSMISSION

This application claims priority from German Application Serial No. 10 2007 000 556.5 filed Oct. 24, 2007.

FIELD OF THE INVENTION

The invention concerns a method for automatically controlling of a neutral position and a parking lock of an automatic or automated motor vehicle transmission, such that the neutral position and the parking lock provided for immobilizing the motor vehicle can be engaged in accordance with a drive setting (P, R, N, D) selected by the driver using a selector device and as a function of other operating parameters of the motor vehicle. In addition, the invention concerns a motor vehicle controlled by the method.

BACKGROUND OF THE INVENTION

Known automatic or automated motor vehicle transmissions as a rule have a parking lock by way of which a transmission output shaft can be mechanically fixed. Besides a purely mechanical system for actuating of such a parking lock with an active mechanical connection between a selector lever operated by the driver inside the motor vehicle and the parking lock in the transmission, electro-mechanical and electro-hydraulic systems for actuating such a parking lock are also known from DE 41 27 991 C2. The parking lock in the transmission is connected by an active electric connection to a selector device operated by the driver inside the motor vehicle and the parking lock can be actuated electro-mechanically or electro-hydraulically byway of a parking lock function implemented in an electronic control unit of the transmission and as a function of other operating parameters of the motor vehicle.

Furthermore, various methods for automatically engaging such a parking lock are known. For example, in U.S. Pat. No. 3,937,105 it is proposed to engage the parking lock of the transmission automatically and independently of the drive position selected by the driver if an ignition circuit of the motor vehicle is interrupted and simultaneously the motor vehicle is still rolling at a speed lower than a defined, low threshold value.

From U.S. Pat. No. 4,892,014 a method is known, in which the parking lock of the transmission is automatically engaged by an electric motor if an ignition circuit of the motor vehicle is interrupted and simultaneously the speed of the vehicle is below a defined low threshold value, but also if the driver's door of the motor vehicle is open and simultaneously the driver's seat in the motor vehicle is unoccupied and simultaneously the speed of the vehicle is below the low threshold value. In both cases, it is provided that when the parking lock is engaged automatically, in addition a parking brake of the motor vehicle is automatically actuated. In U.S. Pat. No. 4,892,014 it is also proposed that when the ignition circuit is engaged, but without the drive engine of the motor vehicle running, the transmission is automatically shifted to its neutral position by an electric motor without this having to be done by the driver.

Finally, from EP 0 814 287 B1 a method for automatically engaging the parking lock of an automatic transmission is known in which the parking lock in the automatic transmission is automatically engaged by the transmission control unit when the speed of the vehicle is zero and simultaneously an ignition circuit has been interrupted and, as a further condition, either a predetermined time interval after the interruption of the ignition circuit has passed or a door of the vehicle is open, but at the latest when—and in that case as the sole condition—the ignition key has been removed from the ignition lock. To achieve better availability of the vehicle, as a special feature in all three cases the engagement of the parking lock is prevented, directly before switching off the engine or within a predetermined time interval after the engine has been switched off, if the driver has selected neutral by way of the selector lever.

The purpose of the present invention is to provide a method alternative to those of the prior art for the automatic engagement of a neutral position and a parking lock in an automatic or automated transmission of a motor vehicle, which secures the motor vehicle sufficiently well against starting or free rolling unintended by the driver, and avoids changes of the operating condition of the transmission or the vehicle that could take the driver by surprise while interfering as little as possible with the vehicle's ability to be driven or operated.

SUMMARY OF THE INVENTION

In the method according to the invention an Auto_P function with complex function logic is proposed, which starts from a method in which a neutral position of an automatic or automated transmission of a motor vehicle and a parking lock of the transmission provided in order to immobilize the motor vehicle can be automatically engaged, depending on a drive setting selected by the driver of the motor vehicle, using a selector device and also depending on other operating parameters of the motor vehicle. The essential feature of the invention here is the functional linking of the individual aspects or individual criteria. To provide a clear illustration of these functional links in what follows known Boolean logic operators are used and, for better readability, emphasized by the use of capital letters.

According to the invention, the method comprises the following process steps:

IF the motor vehicle is at least nearly stationary AND at the same time an ignition circuit associated with a drive engine of the motor vehicle is electrically interrupted AND a "Park" (P) drive setting has been selected using the selector device, THEN the parking lock of the transmission is and remains engaged;

IF the motor vehicle is at least nearly stationary AND at the same time the ignition circuit of the drive engine is electrically interrupted AND a "Drive" (D) or "Reverse" (R) drive setting is selected, THEN the parking lock of the transmission is automatically engaged;

IF the motor vehicle is at least nearly stationary AND at the same time the ignition circuit of the drive engine is electrically interrupted AND a "Neutral" (N) drive setting has been selected by way of the selector device AND a N-holding phase that can be actuated by way of a separate operating device provided in addition to the selector device has been actuated, provided that the parking lock of the transmission has not yet been engaged, THEN the transmission is automatically shifted to a friction-force-free neutral position and held temporarily in the friction-force-free neutral position;

IF the motor vehicle is at least nearly stationary AND at the same time the ignition circuit of the drive engine is electrically interrupted AND a "Neutral" (N) drive setting has been selected by way of the selector device AND the N-holding phase has not been actuated, THEN the parking lock of the transmission is automatically engaged.

Thus, it is proposed that with a separate operating device provided in addition to the selector device, an N-holding phase can be actuated in which the transmission is in a friction-force-free neutral position. This N-holding phase, however, generally cannot be actuated if the selector device has been used to specify a drive setting other than "Neutral" (N)—for example a "Drive" (D) or "Reverse" (R) or "Park" (P) setting—provided that the parking lock of the transmission has not yet been engaged. In this case, a time interval can be predefined within which the N-holding phase must be actuated by the separate operating device for the parking lock of the transmission not to be automatically engaged. Expediently, such a time interval begins at the time when the ignition circuit is electrically interrupted. The N-holding phase can then generally also be actuated only if, in addition, the motor vehicle is at least nearly at rest and at the same time an ignition circuit that acts upon the drive engine, is electrically interrupted.

The method can be used appropriately when the driver of the motor vehicle has stopped in front of a car wash machine and has switched off the drive engine by interrupting the ignition circuit associated with the engine, where the transmission of the motor vehicle would automatically engage the parking lock by virtue of the system without any additional measures—for example because there is no longer any oil pressure in the transmission since the oil pump is now idle.

Thanks to the method, it is now possible for the driver to put the motor vehicle in an operating condition deliberately, rapidly and with simple operating means in which, despite the fact that the drive engine is off the motor vehicle, can still roll, provided that the "Neutral (N) drive setting has previously been selected. In contrast, if any drive setting other than "Neutral" (N) has been specified by way of the selector device then, for the sake of safety, the motor vehicle is generally brought to a condition in which its drive output is locked.

As a result, by virtue of the linking of the four individual functions of the method by the logical AND operation, high vehicle availability is achieved at the same time as maximum safety for vehicle passengers and the surroundings against undesired rolling away of the motor vehicle.

The first of these four individual functions of the method ("IF the motor vehicle is at least nearly at rest AND simultaneously an ignition circuit associated with a drive engine of the motor vehicle is electrically interrupted AND a "Park" (P) drive setting has been selected using the selector device, THEN the parking lock of the transmission is and remains engaged") takes into account those operating conditions in which the driver has himself selected the parking position using the selector device of the motor vehicle before or during the recognition that the motor vehicle with its ignition circuit interrupted is at rest or at least almost immobile. This first of the four individual functions of the method also takes into account operating conditions in which, during a previously actuated N-holding phase, the driver selects the parking position with the selector device of the motor vehicle and thereby deliberately terminates the previously actuated N-holding phase. This clear wish of the driver that the motor vehicle should be immobilized by engaging the parking lock of the transmission, is implemented in the transmission by virtue of the first individual function.

The second of the four individual functions of the method ("IF the motor vehicle is at least nearly at rest AND simultaneously the ignition circuit of the drive engine is electrically interrupted AND simultaneously a "Drive" (D) or "Reverse" (R) drive setting is selected, THEN the parking lock of the transmission is automatically engaged") takes into account the operating conditions in which, before or during the recognition that the motor vehicle with its ignition circuit interrupted is at rest or at least almost immobile, the selector device is in a position which would result in friction force transfer in the transmission if the drive motor is running and the supply of pressure medium to the transmission is sufficient. In such a case, from the safety aspect the parking lock of the transmission is engaged automatically to prevent any possibility that the motor vehicle rolls away inadvertently.

The third of the four individual functions of the method ("IF the motor vehicle is at least nearly at rest AND simultaneously the ignition circuit of the drive engine is electrically interrupted AND at the same time a "Neutral" (N) drive setting has been selected by way of the selector device AND at the same time a N-holding phase that can be actuated by way of a separate operating device provided in addition to the selector device has been actuated, provided that the parking lock of the transmission has not yet been engaged, THEN the transmission is automatically shifted to a friction-force-free neutral position and held temporarily in the friction-force-free neutral position") defines the possibility that under quite specific conditions the transmission can deliberately be brought to a friction-force-free condition. The initiation conditions are listed, which must necessarily be fulfilled for the N-holding phase to be actuated. The status of the transmission, when the N-holding phase is active, is clearly described. Furthermore, in the context of the third individual function, it is already established that the transmission cannot unconditionally be brought to the friction-force-free condition, and will be discussed in more detail later.

In the context of the third individual function, the predefined time interval already mentioned can be provided, within which the N-holding phase must be actuated by way of the separate operating device so that the parking lock of the transmission is not automatically engaged. Expediently, such a time interval begins at the moment when the ignition circuit is electrically interrupted. A typical value for such a time interval is between 1 and 10 seconds.

In addition to the initiation conditions that must necessarily be fulfilled in order to actuate the N-holding phase in which the transmission is in a friction-force-free neutral position, other initiation conditions too can be specified, which also have to be fulfilled in order to be able to actuate the N-holding phase. For example, it can be provided that in addition to the four initiation conditions already mentioned, namely "motor vehicle is at least almost at rest", "ignition circuit associated with the drive engine is electrically interrupted", "drive setting Neutral (N) has been selected" and "parking lock of the transmission is not yet engaged", which must all be fulfilled simultaneously in order to activate the N-holding phase at all by way of the separate operating device, at the same time a further condition "motor vehicle is at least approximately in a horizontal position" must also be fulfilled in order to be able to activate the N-holding phase.

For example, it can also be provided that in addition to the four initiation conditions "motor vehicle is at least almost at rest", "ignition circuit associated with the drive engine is electrically interrupted", "drive setting Neutral (N) has been selected" and "parking lock of the transmission is not yet engaged", which must all be fulfilled at the same time in order to be able to activate the N-holding phase at all by way of the separate operating device, at the same time a further condition "ignition key has not been removed from a mechanical or electro-mechanical ignition lock associated with the ignition key is not outside a defined zone around an electronic ignition lock of the motor vehicle associated with the ignition key" must be fulfilled in order to activate the N-holding phase.

All the initiation criteria can also be rationally combined with one another. For example it can be provided that the N-holding phase can only be activated IF the motor vehicle is in an at least approximately horizontal position AND at the same time a determined current speed of the motor vehicle is slower than a predefined low threshold value (typically slower than 5 km/h (3.1 mi/h)) AND at the same time an ignition key has not been removed from a mechanical or electro-mechanical ignition lock associated with the ignition key or is not outside a defined zone around an electronic ignition lock of the motor vehicle associated with the ignition key AND at the same time a drive setting "Neutral" (N) has been set by way of the selector device AND at the same time the parking lock of the transmission is not yet engaged. In this case, five individual functions, each with its own function logic, are then linked via Boolean AND operators into one complex initiation criterion.

In addition, it can also be provided that the N-holding phase can only be activated if it is recognized that the driver does not want to leave or is not leaving the motor vehicle. It can be concluded that the driver intends or is about to leave the motor vehicle or has just left it, when at least one or more of the following example criteria:

"a driver's door of the motor vehicle is open",

"a driver's seatbelt catch is open",

"a driving seat occupation detector signals that the driving seat is unoccupied", has been fulfilled, and in this it is best to link at least two of these criteria functionally with one another by way of "logical AND".

In addition, it can also be provided that the N-holding phase can only be activated if an energy management system of the motor vehicle or the transmission checks that sufficient energy is available to hold the transmission in the friction-force-free neutral position at least for a predefined time. Such a part-function serves to protect the on-board electric system of the motor vehicle and to ensure that the drive engine can be started. In this connection, reference can be made to customary transmission designs with an electro-hydraulically actuated parking lock system in which the parking lock is disengaged by hydraulic pressure, held in the disengaged condition by way of an electrically energized electromagnet and engaged by spring force if there is no hydraulic pressure and the electromagnet is switched off. Particularly, in conjunction with a transmission of that type the aforesaid proposed functional extension can ensure that the N-holding phase cannot be activated if the on-board electric system, already only a short time after the activation of the N-holding phase, could supply the necessary electrical energy only insufficiently or even no longer at all. In this way, a brief, forced interruption of the previously activated N-holding phase, which would take the driver by surprise, is avoided and—especially in applications when such a forced interruption of the previously activated N-holding phase is not functionally implemented—the ability to start the drive engine of the motor vehicle is ensured.

A technically simple practical embodiment of such a function for protecting the on-board electric system of the motor vehicle and ensuring that the drive engine can be started, can consist in blocking the activation of the N-holding phase if the current electric voltage and/or the current electric charge condition of the energy accumulator of the motor vehicle, whose electrical energy is supplied for starting the drive engine and/or for energizing the transmission control unit, has/have fallen below a predefined lower limit value. The term "predefined lower limit value" should here be understood to mean an absolute numerical value, for example an electric voltage of 12.5 volt.

In a technically more elaborate, but functionally more exact version of such a function for protecting the on-board electric system of the motor vehicle and ensuring that the drive engine can be started, it is proposed that the current charge condition of the energy accumulator or the charge condition of the energy accumulator at the beginning of the N-holding phase or the current electric voltage of the energy accumulator or the electric voltage of the energy accumulator at the beginning of the N-holding phase, should be set into mathematical relation with the amount of electrical energy needed in order to hold the transmission in a friction-force-free neutral position for a predefined time. Correspondingly, in an example embodiment of such a function, it can be provided that the activation of the N-holding phase is blocked if the computed difference between the current electric charge condition of the energy accumulator whose electrical energy is provided for starting the drive engine and/or for supplying the transmission control unit, and the amount of electrical energy needed in order to hold the transmission in a friction-force-free neutral position for a predetermined time, has fallen below a predefined lower limit value. A reasonable value for such a time is a period of 20 or 30 minutes. The amount of energy required can be determined by computer comparatively simply by integrating the theoretical current uptake of the transmission control unit determined by the components used over the predefined time period or by integrating the mathematical product of the actual operating voltage and the theoretical current uptake of the transmission control unit over the predefined time period. In a further development of this function, the predefined lower limit value can also be predefined as a function of a drive engine temperature or a temperature of the vehicle's surroundings, where the battery discharge behavior and the higher energy demand for starting the engine at low temperatures are particularly taken into account.

As a result, a high degree of protection against inappropriate activation of the N-holding phase is achieved by the logical linking of these initiation conditions or part-functions within the framework of the third individual function of the method according to the invention by way of the "logical AND" operator.

Coming back to the last of the four individual functions of the method, this fourth individual function of the method ("IF the motor vehicle is at least nearly at rest AND simultaneously the ignition circuit of the drive engine is electrically interrupted AND simultaneously a "Neutral" (N) drive setting has been selected by way of the selector device AND simultaneously the N-holding phase has not been actuated, THEN the parking lock of the transmission is automatically engaged") takes into account those operating conditions in which, before or during the recognition that the motor vehicle is at rest or at least nearly so with its ignition circuit interrupted, the selector device is in the "Neutral" (N) drive setting, but the N-holding phase has not been activated. In such a case, for safety reasons the parking lock is automatically engaged so as to prevent inadvertent rolling away of the motor vehicle in any circumstances.

Below, the possible functions of the method will be discussed in more detail in the context of the activated N-holding function, divided into the categories "important functions when the N-holding function has been activated" and "optional functions when the N-holding phase has been activated". If necessary, those with an understanding of the subject will be able to combine the functions proposed with one another in appropriate ways.

An important function is that when the N-holding phase is to be and/or is activated an acoustic and/or optical indication is triggered and/or emitted at the same time. This reminds the driver that he has carried out a manual intervention or that an intervention, which concerns the immobilization of the motor vehicle has taken place and that the motor vehicle can consequently roll.

As an optional function for improving the safeguard against inadvertent removal of the ignition key, it can be provided that when the holding phase is to be and/or has been activated an ignition lock detent—also known as a "key lock"—will be and/or is at the same time activated to prevent the extraction of the mechanical ignition key from its mechanical or electro-mechanical ignition lock or the electronic ignition key—for example of the type known as an "ID card"—from being removed too far from its electronic ignition lock.

With regard to the de-activation of the previously deliberately activated N-holding phase in which the transmission is in a friction-force-free neutral position, two variations are proposed. In the first of these two variations, it is proposed that the previously activated N-holding phase can be de-activated manually by the driver—preferably by way of the separate operating device, this being a function in the category of "important functions". In this case, it is appropriate that when the previously activated N-holding phase has been terminated manually, the parking lock is engaged automatically regardless of the prior selection of the "Neutral" (N) drive setting by way of the selector device. The selector device is also available to the driver for manually de-activating the previously activated N-holding phase, simply by changing the specified drive position from the previous "Neutral" (N) to "Park" (P).

In the second variation, it is proposed that the previously activated N-holding phase in which the transmission is in the friction-force-free neutral position, can be de-activated automatically. When such an automatic termination of the previously activated N-holding phase should or must take place, this is particularly because operational safety and breakdown security aspects of the system are involved.

As an important function to protect the on-board electrical system of the motor vehicle and to ensure that the drive engine can be started, it is proposed that the previously activated N-holding phase can be automatically de-activated by an energy management system of the motor vehicle or the transmission. The problems relating to customary transmission designs with parking lock systems that can be activated electrohydraulically in which the parking lock is held in the disengaged condition by way of an electrically energized electro-magnet, have already been discussed in the context of the initiation conditions to be fulfilled for the N-holding phase to be activated. Particularly in conjunction with such a transmission, this proposed functional extension can prevent the battery from becoming too far discharged because of the amount of electrical energy consumed by the method according to the invention.

An efficient protection of the vehicle's battery against excessive discharge is provided by monitoring the actual electric charge condition or the actual electric voltage of the vehicle's battery. Correspondingly, in one embodiment variation, it is proposed that the previously activated N-holding phase is automatically terminated when the actual charge condition and/or the actual electric voltage of an energy accumulator of the motor vehicle, whose electrical energy is provided for starting the drive engine and/or for supplying the transmission control unit, has fallen to a value below a predefined discharge threshold. Here, the term a "predefined discharge threshold" should be understood to mean an absolute numerical value, for example an electric voltage of 12 volts.

In a technically more elaborate, but functionally more exact version of such a function for protecting the on-board electrical system of the motor vehicle and ensuring that the drive engine can be started, it is proposed to monitor the amount of energy actually drawn, in the context of the method from the motor vehicle's battery or from the electrical energy accumulator of the motor vehicle provided for supplying the transmission control unit and/or for starting the drive engine—in particular by the transmission control unit—and relate the mathematical amount to the actual charge condition of the energy accumulator or the charge condition of the energy accumulator at the beginning of the N-holding phase or the actual electric voltage of the energy accumulator or the electric voltage of the energy accumulator at the beginning of the N-holding phase. Correspondingly, in an example embodiment of such a function, it can be provided that the previously activated N-holding phase is automatically terminated when the computed difference between the actual charge condition of the energy accumulator whose electrical energy is used for starting the drive engine and/or to supply the transmission control unit, and the quantity of electrical energy which, in the context of the function according to the invention, has been drawn from the electrical energy accumulator of the motor vehicle for maintaining the neutral position of the transmission, has exceeded a predefined upper limit value. This upper limit value is predefined as a function of the actual electric voltage of the energy accumulator or as a function of the electric voltage of the energy accumulator at the beginning of the N-holding phase or as a function of the actual electric charge condition of the energy accumulator or as a function of the electric charge condition of the energy accumulator at the beginning of the N-holding phase. This quantity of energy can be determined by comparatively simple computation by integrating the actual real current uptake of the transmission control unit over the time since the beginning of the N-holding phase or by integrating the mathematical product of the actual operating voltage and the actual current uptake of the transmission control unit over the time since the beginning of the N-holding phase. In a further development of the function, the predefined upper limit value can also be predefined as a function of a drive engine temperature or of a temperature of the motor vehicle's surroundings, where the battery discharge behavior and the increased engine starting energy demand at low temperatures, can particularly be taken into account.

As an optional function for improved safety against inattention by the driver, it can also be provided that the previously activated N-holding phase is automatically terminated after a predetermined time has passed. Such automatic termination of the N-holding phase in a manner of a reproducible event can easily be comprehended by the driver and is, therefore, less surprising to him than other automatic terminations of the N-holding phase. This function also has the advantage that the on-board electric system of the motor vehicle is not overloaded by the process, provided that the charge condition of the vehicle's battery is not already at a low level at the beginning of the N-holding phase. Expediently, the time period begins when the command to activate the N-holding phase is recognized or, at the latest, when the transmission is also actually in its neutral position.

As an optional function to increase safety when operating parameters are changing, it is proposed that the previously activated N-holding phase is automatically terminated if the actual speed of the motor vehicle is higher than a predefined speed threshold. This ensures that the motor vehicle can only roll within predetermined limits. The predefined speed threshold can even be higher than the predefined low vehicle speed threshold which must not be exceeded when activating the N-holding phase.

To improve safety when operating parameters are changing, it can also be provided as an optional function that the previously activated N-holding phase is automatically terminated if the motor vehicle is not in an at least approximately horizontal position.

As an optional function to increase safety against driver inattention and misuse, it is proposed that the previously activated N-holding phase is automatically terminated if the ignition key has been removed from its mechanical or electro-mechanical ignition lock or if it is outside a defined zone around its electronic ignition lock.

In conjunction with all the previously mentioned functions for automatic de-activation of a previously activated N-holding phase, for safety reasons it is proposed that when the previously activated holding phase is automatically terminated, the parking lock is automatically engaged regardless of the drive setting "Neutral" previously selected by way of the selector device. This reliably prevents the transmission from later being put into a shift position that would immediately lead to force transfer in the transmission when the engine is started.

As a further function of the category "important functions when the N-holding phase is activated", it is envisaged to monitor whether the driver is still present in the motor vehicle. This monitoring serves to increase the safeguard against possible driver inattention. With regards the reaction upon recognition that the driver wants to leave the vehicle or is just leaving it, while the drive engine ignition circuit of the at least almost stationary vehicle, has been interrupted and the N-holding phase is active so that, correspondingly, the transmission is in a friction-force-free neutral position, two different embodiment variations are proposed. In the safety-orientated, first variation it is proposed to terminate the N-holding phase automatically without delay and to engage the parking lock automatically when it is recognized that the driver wants to leave the motor vehicle or is just leaving it. In the mobility-orientated, second variation, it is proposed to leave the N-holding phase active and, at the same time, to trigger or actuate a suitable warning when it is recognized that the driver wants to leave or is just leaving the motor vehicle. This—for example acoustic and/or visual—warning is intended to alert the driver that the N-holding phase is still active and that therefore the transmission is still friction-force-free so that the motor vehicle can still roll. If the driver ignores this warning and leaves the vehicle without first having selected "Park" (P) with the selector device and/or without having de-activated the N-holding phase by way of the separate operating device, then it can be assumed that he deliberately wants to keep the vehicle in a condition in which it can roll, without himself having to be present inside the vehicle. Of course, the other criteria for automatic termination of the N-holding phase are not affected by this part-function and can therefore still lead, as described, to the automatic engagement of the parking lock. As also already mentioned earlier, it can be concluded that the driver intends to or is moving towards leaving the motor vehicle if one or more of the following example criteria are fulfilled:

"a driver's door of the motor vehicle is open",
"a driver's seatbelt catch is open",
"a driver's seat occupation recognition system indicates that the driver's seat is unoccupied".

In other respects those with an understanding of the subject will, if necessary, be able to combine the proposed features for the automatic de-activation of the N-holding phase in an appropriate way with one another and also, if necessary, with the features that relate to the manual de-activation of the N-holding phase.

BRIEF DESCRIPTION OF THE DRAWINGS

The invention will now be described, by way of example, with reference to the accompanying drawings in which.

DETAILED DESCRIPTION OF THE INVENTION

Figure 1A:
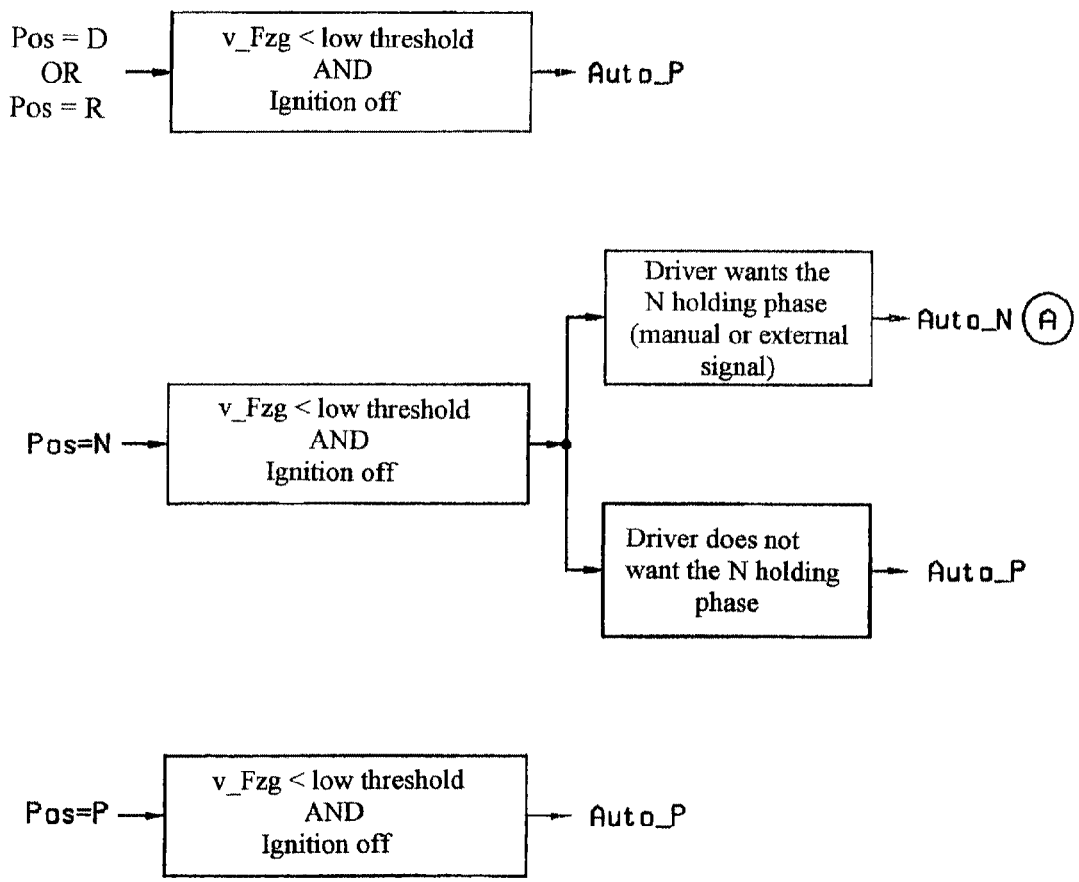
FIGS. 1A and 1B shows a diagrammatic function sequence diagrams and FIG. 1C shows a variation of FIG. 1A.
Figure 1B:
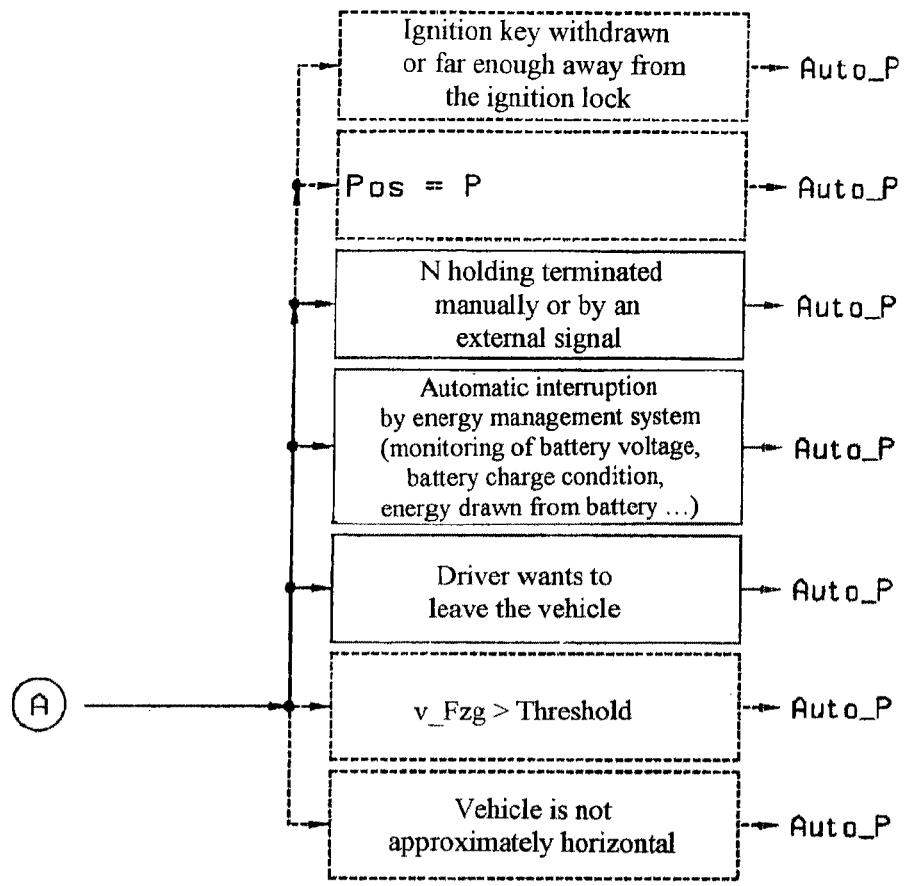
Figure 1C:
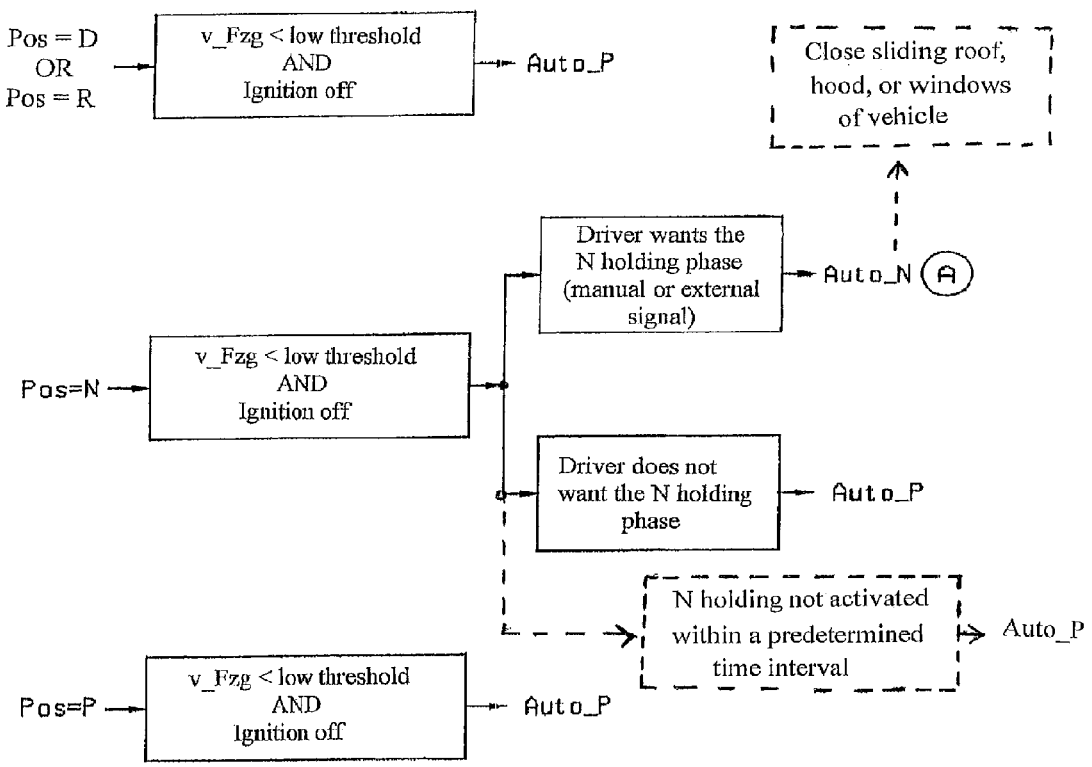
Figure 2A:
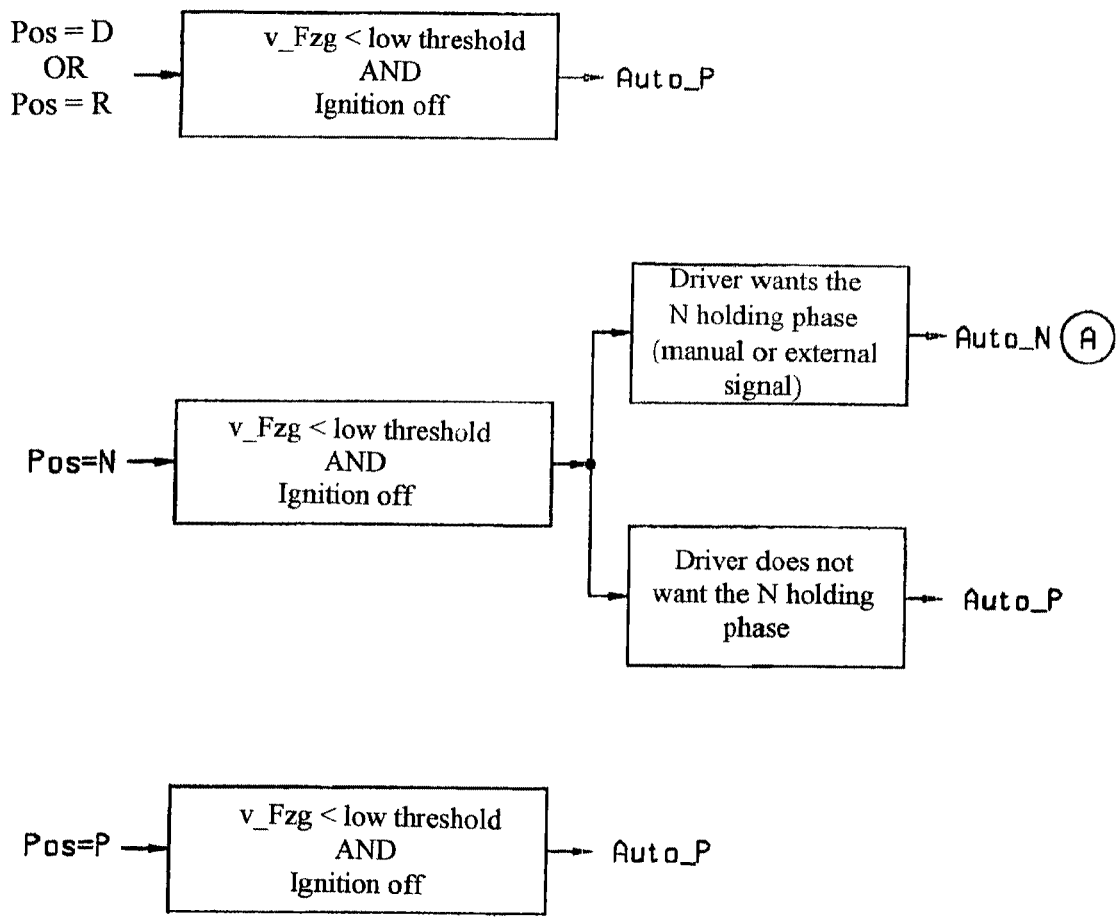
FIGS. 2A and 2B shows another diagrammatic function sequence diagram.
Figure 2B:
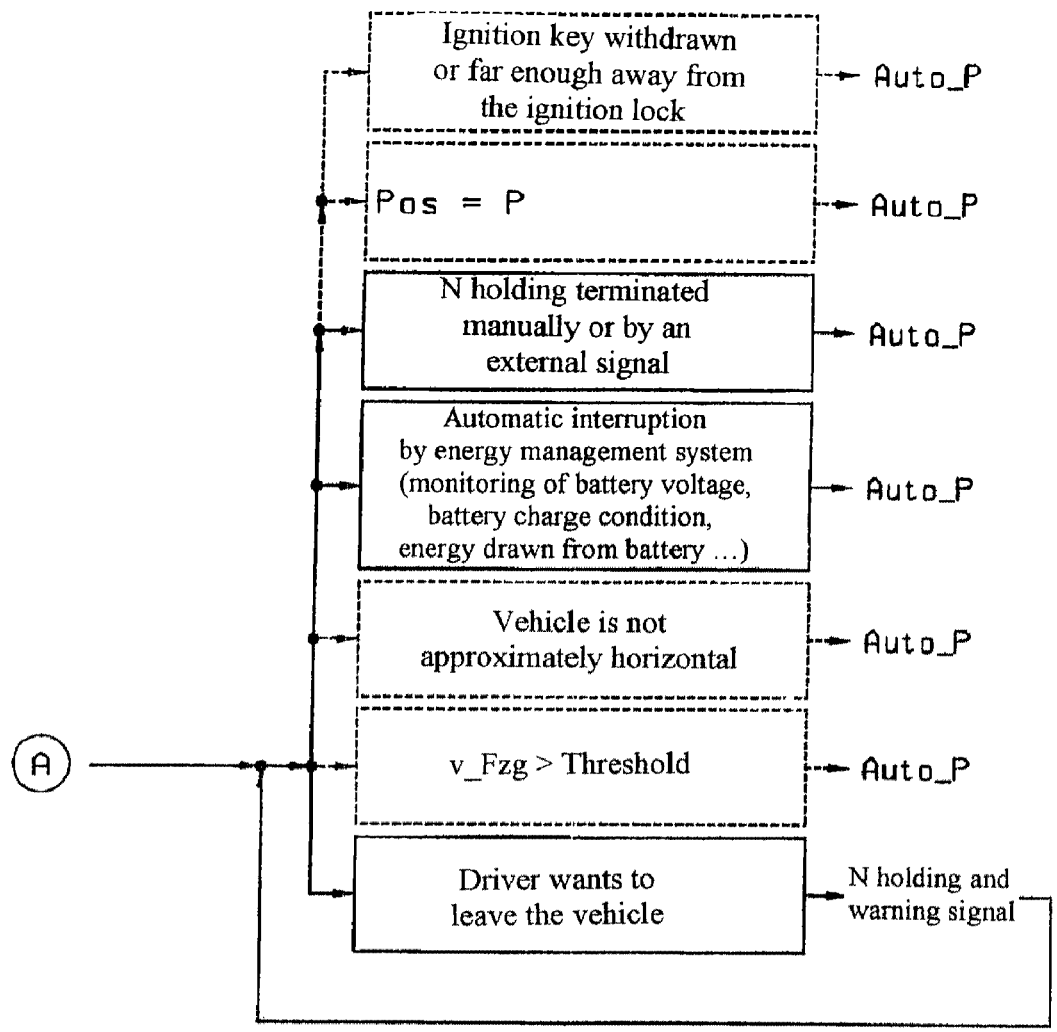

For the purpose of explaining the method further, FIGS. 1 (part—FIGS. 1A, 1B) and 2 (part—FIGS. 2A, 2B) show two different function sequence diagrams, each as an example of a technical implementation of a method according to the system of the invention described above in detail. In the Figures, function blocks which in the context of the respective technical implementation are unconditionally necessary, are represented using continuous lines, while in contrast function blocks which in the context of the respective technical implementation can be provided optionally, are represented using broken lines. Since in light of the detailed description of the method according to the invention the two graphical representations are clearly understandable per se by those with knowledge of the field, at this point, and to avoid repetitions, there is no need for a comprehensive explanation of the Figures. The indexes and their meanings are listed in the list of indexes.

The essential difference between the two graphically represented function sequence diagrams is easy to see: in the first case (FIG. 1) the parking lock of the transmission is engaged automatically ("Auto_P") if, while the N-holding phase is activated ("Auto_N"), the driver's wish to leave the motor vehicle is recognized. In contrast, in the second case (FIG. 2) the transmission remains in its neutral position ("N_hold") if the driver's wish to leave the motor vehicle while the N-holding phase is activated is recognized, and the driver is alerted by a suitable warning to the fact that the transmission is friction-force-free and that the vehicle could roll freely. In the second case (FIG. 2), therefore, the driver is given more room for maneuver since it is assumed that in bringing the transmission to the neutral position and getting out of the vehicle, the driver is acting quite deliberately and intentionally.

Below, further developments of the method according to the invention are described, which relate to a further increase of comfort for the driver of the motor vehicle. For example, it can be provided that by way of the separate operating device provided for activating the N-holding phase, other aggregates of the motor vehicle as well can be controlled, e.g., only permitting activation of the Neutral-holding phase within a predefined time interval as shown in FIG. 1C. A particularly advantageous application of such a further development is when, by way of the separate operating device, at the same time as or at a time close to the activation of the N-holding phase, a command is also issued to close an electric-motor-activated sliding roof or an electric-motor actuated or electro-hydraulically actuated folding or tilting roof and/or electric-motor-actuated windows of the motor vehicle, as also shown in FIG. 1C.

Below, further features of the method according to the invention are described in more detail, which relate to particular designs of the separate operating device provided at least for activating the N-holding phase with a friction-force-free neutral position in the transmission.

For example, it can be provided that the separate operating device for activating and de-activating the N-holding phase is formed as a switch that can be operated by the driver. Correspondingly, the N-holding phase in which the transmission is in the friction-force-free neutral position can then be activated and/or de-activated manually by the driver by operating the switch. The structure and spatial arrangement of such a switch inside the motor vehicle are arbitrary and at the discretion of those with knowledge of the subject. An example embodiment of this is an electro-mechanical switch integrated in the ignition lock, in such a manner that the N-holding phase is activated when the ignition circuit is electrically interrupted by way of the ignition lock. As another example embodiment, an electromechanical switch can be mentioned, which is integrated as part of or in the selector device.

However, it can also be provided that the separate operating device for activating and de-activating the N-holding phase is formed as a switch that can be operated remotely and can be actuated from outside the motor vehicle. Correspondingly, the N-holding phase in which the transmission is in a friction-force-free neutral position can then be activated and/or de-activated by actuating the remotely operated switch from the outside the motor vehicle. In this case, in particular systems with a (static or mobile) sender outside the motor vehicle come into consideration in order to be able to influence the maneuverability of the vehicle selectively from its exterior, for example with a sender at the entry to a car wash installation or with a sender in a workshop.

Furthermore, it can also be provided that the separate operating device for activating and de-activating the N-holding phase is made as a sensor, which evaluates signals from the surroundings of the motor vehicle. Correspondingly, the N-holding phase in which the transmission is in the friction-force-free neutral position can then be activated and/or de-activated by this sensor. Particularly to be considered here are sensors for image reception, with which signboards or the entrance to a car wash installation or a level-crossing can be recognized in a suitable manner in the sense of a pattern recognition for predefined environmental conditions in which the drive setting selected by the selector device does not necessarily give the highest priority to which gear is actually engaged in the transmission.

If necessary, those with knowledge of the field will be able to combine the three switch variations mentioned, namely "driver-operated switch", "remotely operated switch" and "sensor" in appropriate ways.

In principle, the method is suitable for controlling a parking device of any desired structure provided for immobilizing the motor vehicle. Thus, the parking device can be either a parking lock with a positive-interlock holding action or one with a friction force holding action. Usually, a parking device in the transmission is formed as a parking lock, but it can also be in the form of a parking brake.

Usually, the parking lock of an automatically shifted or automated transmission is integrated in the transmission itself. Usually too, the parking lock control system that operates in known transmissions mechanically, hydraulically, pneumatically, electrically, hydraulic-mechanically, pneumatic-mechanically, electromechanically, electrohydraulically or electropneumatically, is integrated in the transmission itself or arranged directly on the outside of the transmission. In the case of an electro-mechanical, electro-hydraulic or electro-pneumatic parking lock control system, the actuator that acts upon the parking lock is usually controlled by a transmission control unit. Accordingly, it is expedient to integrate in the transmission control unit all the control functions required in order to implement the command to activate in the transmission the N-holding phase with a friction-force-free neutral position of the transmission, and to de-activate it again so that the transmission control unit initiates the engagement of the neutral position in the transmission when the N-holding phase is activated and the engagement of the parking device in the transmission when the N-holding phase is de-activated.

In principle, however, a separate control unit can be provided for this, which then communicates in a suitable manner with the transmission and its transmission control unit. In any case suitable communication is needed between the separate operating device and the transmission and transmission control unit. It can be provided that the engagement of the neutral position in the transmission when the N-holding phase is activated and the engagement of the parking lock, when the N-holding phase is de-activated, are initiated by a control unit of the separate operating device.

As already mentioned, the method is also suitable for controlling a parking brake of any desired structure. A parking brake provided in the vehicle is usually an integral constituent of the working brake system in the vehicle, which can be operated mechanically or electro-hydraulically by the driver and also by a brake control unit if there is one. Also known, however, are autonomous systems, i.e., ones which are independent of the working brakes of the motor vehicle. In connection with the control of a parking brake in the vehicle in the context of the invention, in all cases suitable communication is needed, between the separate operating device and the other two components involved, namely the "parking brake and transmission or brake system and transmission control device".

A motor vehicle has an automatic or automated transmission, a selector device that can be operated by the driver of the motor vehicle to specify a drive setting (P, R, N, D) of the transmission, a parking lock in the transmission to immobilize the motor vehicle, a control unit to control the parking lock of the transmission and shift positions in the transmission as a function of the drive setting (P, R, N, D) selected at the selector device and also depending on other operating parameters of the vehicle and an additional, separate operating device for specifying a holding phase in which the transmission is in a friction-force-free neutral position and is controlled in accordance with the method according to the invention as described above.

REFERENCE NUMERALS v_Fig speed of the vehicle
Pos drive setting selected at a selector device
P "Park" drive setting
N "Neutral" drive setting
R "Reverse" drive setting
D "Drive forward" drive setting
Auto_N function step "Engage and maintain the neutral position in the transmission"
Auto_P function step "Engage the parking lock and maintain it in the engaged condition"
N_holding function step "Maintain the neutral position in the transmission
N-holding phase condition "Transmission is in the friction-force-free neutral position"

The invention claimed is:

1. A method for controlling a neutral position and a parking lock of one of an automatic or automated transmission of a motor vehicle such that the neutral position and the parking lock, provided for immobilizing the motor vehicle, are engaged depending on a drive setting (P, R, N, D) selected by a driver of the motor vehicle using a selector device and depending on operating parameters of the motor vehicle, the method comprising the steps of:
   engaging and retaining engagement of the parking lock of the transmission IF the motor vehicle is at least substantially stationary AND simultaneously an ignition circuit associated with a drive engine of the motor vehicle is electrically interrupted, AND a "Park" (P) drive setting has been selected using the selector device;
   automatically engaging the parking lock of the transmission IF the motor vehicle is at least substantially stationary AND simultaneously the ignition circuit of the drive engine is electrically interrupted AND one of a "Drive" (D) or a "Reverse" (R) setting is selected using the selector device;
   automatically shifting and temporarily retaining the transmission to a friction-force-free neutral position IF the motor vehicle is at least substantially stationary AND simultaneously the ignition circuit of the drive engine is electrically interrupted AND a "Neutral" (N) drive setting has been selected using the selector device AND a Neutral-holding phase, that is actuated by a separate operating device provided in addition to the selector device, has been actuated provided that the parking lock of the transmission has not yet been engaged; and
   automatically engaging the parking lock of the transmission IF the motor vehicle is at least substantially stationary AND simultaneously the ignition circuit of the drive engine is electrically interrupted AND the "Neutral" (N) drive setting has been selected using the selector device AND the Neutral-holding phase has not been actuated.

2. The method according to claim 1, further comprising the step of predefining a time interval, and only permitting activation of the Neutral-holding phase if the Neutral-holding phase is activated with the separate operating device within the predefined time interval.

3. The method according to claim 1, further comprising the step of only permitting activation of the Neutral-holding phase when the motor vehicle is in an at least approximately horizontal position.

4. The method according to claim 1, further comprising the step of only permitting activation of the Neutral-holding phase when an ignition key remains within a mechanical or electro-mechanical ignition lock associated with the ignition key, or remains within a defined zone around an electronic ignition lock of the motor vehicle associated with the ignition key.

5. The method according to claim 1, further comprising the step of only permitting activation of the Neutral-holding phase if the method recognizes that the driver does not wish to leave or is not leaving the motor vehicle.

6. The method according to claim 1, further comprising the step of only permitting activation of the Neutral-holding phase when an energy management system of the motor vehicle or transmission recognizes that a sufficiently large amount of energy is available to retain the transmission in the friction-force-free neutral position, at least for a predefined time period.

7. The method according to claim 6, further comprising the step of only permitting activation of the Neutral-holding phase when the energy management system recognizes at least one of an actual charge condition and an actual electric voltage of an energy accumulator of the motor vehicle, electrical energy of which at least one of supplies a transmission control unit and starts the drive engine, is equal to or greater than a predefined lower limit value.

8. The method according to claim 6, further comprising the step of only permitting activation of the Neutral-holding phase when the energy management system determines a computed difference between an actual electric charge condition of the energy accumulator, electrical energy of which is provided for at least one of starting the drive engine and supplying the transmission control unit, and a quantity of electrical energy needed to retain the transmission for a predefined time period in the friction-force-free neutral position, is equal to or greater than a predefined lower limit value.

9. The method according to claim 8, further comprising the step of determining a quantity of energy by one of mathematically integrating a theoretical current uptake of the control unit over the predefined time period, or mathematically integrating a product of the actual operating voltage and the theoretical current uptake of the control unit over the predefined time period.

10. The method according to claim 7, further comprising the step of predefining the lower limit value as a function of one of a temperature of the drive engine or a temperature of the vehicle's surroundings.

11. The method according to claim 1, further comprising the step of enabling the driver to manually de-activate the previously activated Neutral-holding phase using the separate operating device.

12. The method according to claim 1, further comprising the step of automatically de-activating the previously activated Neutral-holding phase.

13. The method according to claim 12, further comprising the step of automatically deactivating the previously activated Neutral-holding phase when at least one of the following conditions is recognized:
   an ignition key has been removed from a mechanical or electro-mechanical ignition lock or is withdrawn from a defined zone around an electronic ignition lock;
   an actual speed of the motor vehicle is higher than a predefined speed threshold;
   the motor vehicle is not in an at least approximately horizontal position;
   the driver wants to leave the vehicle or is leaving the vehicle; and
   a predefined time interval has passed.

14. The method according to claim 12, further comprising the step of automatically de-activating the previously activated Neutral-holding phase with the energy management system of one of the motor vehicle or the transmission.

15. The method according to claim 14, further comprising the step of automatically de-activating the previously activated Neutral-holding phase if at least one of an actual charge condition and an actual electric voltage of an energy accumulator of the motor vehicle, electrical energy of which is provided for at least one of supplying a transmission control unit and starting the drive engine, is less than a predetermined discharge threshold.

16. The method according to claim 14, further comprising the step of automatically de-activating the previously activated Neutral-holding phase if a quantity of energy which, in the context of the method, has been drawn from an electrical energy accumulator of the motor vehicle provided for at least one of supplying a transmission control unit and starting the drive engine, is equal to or greater than a predefined threshold value.

17. The method according to claim 16, further comprising the step of determining the quantity of energy by at least one of mathematically integrating an actual current uptake of the control unit over time, or mathematically integrating a product of an actual operating voltage and the actual current uptake of the control unit over time.

18. The method according to claim 12, further comprising the step of automatically engaging the parking lock when the previously activated Neutral-holding phase is one of manually or automatically de-activated.

19. The method according to claim 1, further comprising the step of controlling additional aggregates of the motor vehicle with the separate operating device, which activates the Neutral-holding phase.

20. The method according to claim 19, further comprising the step of issuing a command, essentially simultaneously with activation of the Neutral-holding phase, to close at least one of an electric-motor-actuated sliding roof, an electric-motor-actuated folding or hinged hood, an electro-hydraulically actuated folding or hinged hood and electric-motor-actuated windows of the motor vehicle.

21. The method according to claim 1, further comprising the step of providing a switch such that the driver is able to at least one of activate and de-activate manually the Neutral-holding phase.

22. The method according to claim 1, further comprising the step of actuating a remotely operated switch from outside the motor vehicle to at least one of activate and de-activated remotely the Neutral-holding phase.

23. The method according to claim 1, further comprising the step of at least one of activating and de-activating the Neutral-holding phase by a sensor which evaluates signals from surroundings of the motor vehicle.

24. The method according to claim 1, further comprising the step of actuating at least one of an acoustic and visual indication when it is recognized that the driver one of wants to leave or is leaving the vehicle while the Neutral-holding phase is activated.

25. A motor vehicle having one of an automatic or automated transmission, comprises a selector device, which is operated by a driver of the motor vehicle for selecting a drive setting (P, R, N, D) of the transmission, a transmission-side parking lock, a control device for controlling the parking lock of the transmission and shift positions in the transmission depending on the drive setting (P, R, N, D) of the transmission selected using the selector device and other operating parameters of the motor vehicle, and an additional separate operating device for activating an Neutral-holding phase, in which the transmission is in a friction-force-free neutral position, the vehicle being controlled by a method comprising the steps of:

engaging and retaining engagement of the parking lock of the transmission IF the motor vehicle is at least substantially stationary AND simultaneously an ignition circuit associated with a drive engine of the motor vehicle is electrically interrupted AND a "Park" (P) drive setting has been selected using the selector device;

automatically engaging the parking lock of the transmission IF the motor vehicle is at least substantially stationary AND simultaneously the ignition circuit of the drive engine is electrically interrupted AND one of a "Drive" (D) or a "Reverse" (R) setting is selected using the selector device;

automatically shifting and temporarily retaining the transmission to a friction-force-free neutral position IF the motor vehicle is at least substantially stationary AND simultaneously the ignition circuit of the drive engine is electrically interrupted AND a "Neutral" (N) drive setting has been selected using the selector device AND a Neutral-holding phase, that is actuated by a separate operating device provided in addition to the selector device, has been actuated if the parking lock of the transmission has not yet been engaged; and automatically engaging the parking lock of the transmission IF the motor vehicle is at least substantially stationary AND simultaneously the ignition circuit of the drive engine is electrically interrupted AND the "Neutral" (N) drive setting has been selected using the selector device AND the Neutral-holding phase has not been actuated.

* * * * *